United States Patent [19]

Ucida

[11] Patent Number: 5,140,211
[45] Date of Patent: Aug. 18, 1992

[54] ROTOR STRUCTURE OF A SYNCHRONOUS MOTOR

[75] Inventor: Hiroyuki Ucida, Yamanashi, Japan

[73] Assignee: Fanuc Ltd, Yamanashi, Japan

[21] Appl. No.: 667,351

[22] Filed: Jan. 24, 1991

Related U.S. Application Data

[63] Continuation of Ser. No. 362,427, filed as PCT/JP88/00927, Sep. 14, 1988, abandoned.

[30] Foreign Application Priority Data

Sep. 17, 1987 [JP] Japan ................. 62-230939

[51] Int. Cl.[5] .............. H02K 21/12; H02K 1/27; H02K 1/22
[52] U.S. Cl. ................... 310/156; 310/217; 310/261
[58] Field of Search ........... 310/156, 216, 217, 218, 310/261; 29/598

[56] References Cited

U.S. PATENT DOCUMENTS

| | | | |
|---|---|---|---|
| 2,060,259 | 11/1936 | Spengler | 310/156 |
| 2,062,938 | 12/1936 | Ruppe | 310/156 |
| 3,979,821 | 9/1976 | Noodleman | 310/156 |
| 4,543,506 | 9/1985 | Kawada et al. | 310/261 |
| 4,639,627 | 1/1987 | Takekoshi et al. | 310/261 |
| 4,697,114 | 9/1987 | Amemiya et al. | 310/261 |

FOREIGN PATENT DOCUMENTS

| | | |
|---|---|---|
| 0107317 | 5/1984 | European Pat. Off. ........ 310/261 |
| 51-8509 | 1/1976 | Japan . |
| 61-293142 | 12/1986 | Japan . |
| 63-99749 | 5/1988 | Japan . |

*Primary Examiner*—Steven L. Stephan
*Assistant Examiner*—C. LaBalle
*Attorney, Agent, or Firm*—Armstrong, Nikaido, Marmelstein, Kubovcik & Murray

[57] ABSTRACT

Provided is a rotor structure of a radial type synchronous motor having a rotor core (10) is held between permanent magnets (12) wherein end plates (14) are attached to ends of the rotor (8) in a direction of the central axis (6) of the rotor, each of which plates is provided with projecting portions (16) to regulate a radial position of an outer face of the rotor core. This prevents a projection of the rotor core and permanent magnets in the radial direction due to a centrifugal force caused by a rotation of the rotor. Therefore, a rotor structure able to withstand a strong centrifugal force can be provided.

5 Claims, 2 Drawing Sheets

ROTOR STRUCTURE OF A SYNCHRONOUS MOTOR

This application is a continuation of application Ser. No. 362,427 filed as PCT/JP88/00927, Sep. 14, 1988, now abandoned.

DESCRIPTION

1. Technical Field

The present invention relates to a structure of a rotor of a radial type synchronous motor wherein the rotor core as a magnetic pole is held between permanent magnets, and more particularly, to a rotor structure having a high strength able to withstand a centrifugal force generated by a rotation of the rotor.

2. Background Art

A rotor of a motor suffers from the action of a centrifugal force generated by a rotation thereof, and generally, in a radial type synchronous motor in which the rotor core is held between permanent magnets, the element members constituting a rotor of the motor tend to move in a radial direction of the rotor, and a clearance between a rotor and a stator is set to be a very small value to reduce a reluctance thereof. Therefore, it is difficult to adapt such a synchronous motor for a large synchronous motor having a high revolutionary speed, because damage occurs due to contact of the rotor with the stator when an element constituting the rotor projects even a little in the radial direction.

DISCLOSURE OF THE INVENTION

To solve the above problem, an object of the present invention is to provide a rotor structure of a radial type synchronous motor able to withstand a strong centrifugal force.

Therefore, according to the present invention, there is provided a rotor structure of a radial type synchronous motor having a rotor core as a magnetic pole held between permanent magnets, characterized in that an end plate member is used which is provided with projections to regulate the positioning of an outer periphery of at least one of both ends of the rotor core n a direction parallel to a central axis of the rotor.

Accordingly, projection of the rotor core out of the rotor due to a centrifugal force can be prevented because the rotor core is held at the periphery thereof by the projections of the end plate member, and projection of the permanent magnets is also prevented because they are held at the periphery thereof by the rotor core.

BEST MODE OF CARRYING OUT THE INVENTION

Figure 1:
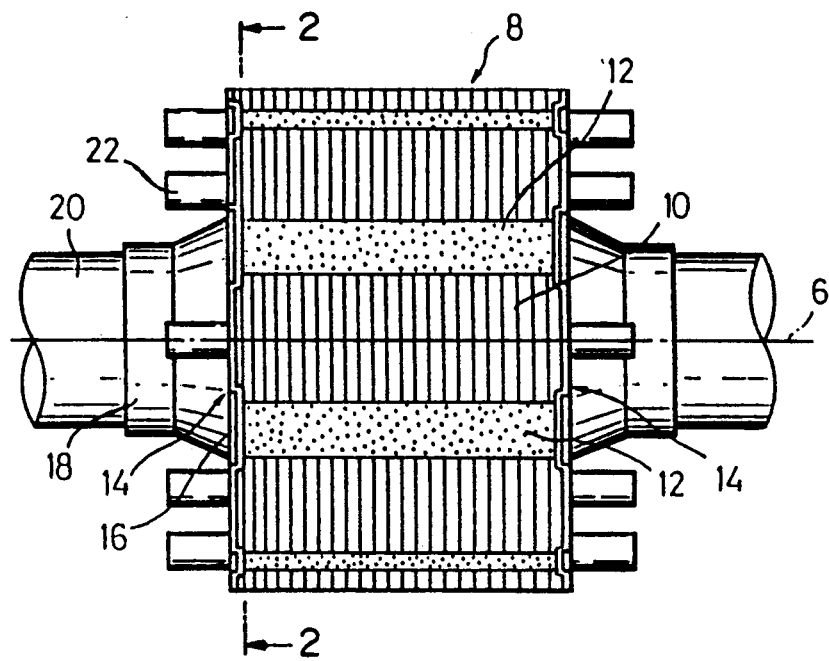
FIG. 1 is a side view of a rotor according to the present invention.
Figure 2:
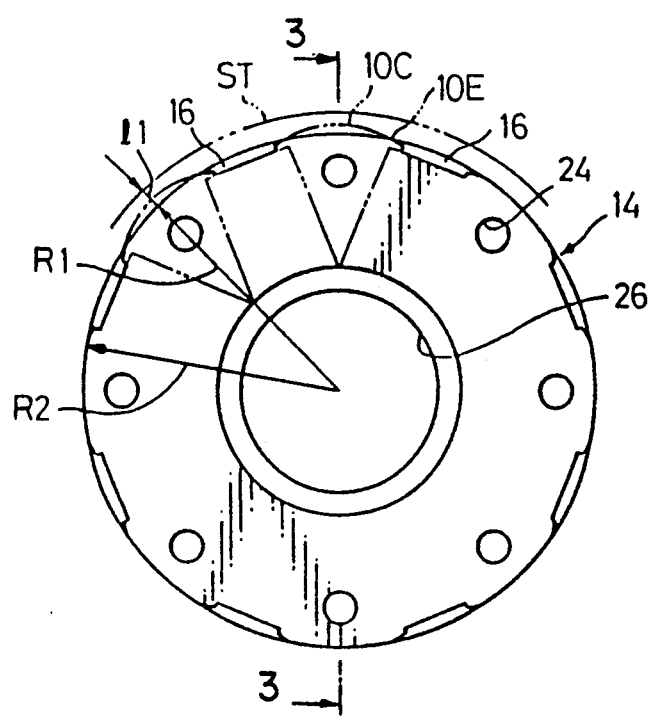
FIG. 2 is a front view of an end plate taken along the line 2—2 of FIG. 1.

The present invention is described in more detail in the following in accordance with the embodiments shown in the attached drawings. Referring to FIG. 1, a rotor 8 is constructed in such a manner that a laminated rotor core 10 consisting of electromagnetic steel plate is held by permanent magnets 12. The rotor core 10 and permanent magnets 12 are held at both ends thereof in a direction of a central axis 6 of a rotor 8 by end plates 14, and the rotor 8 is fixed to an output shaft 20 by an attachment portion 18 of each end plate 14. The same numbers of holes 24 as that of rotor cores 10 are provided in each end plate 14 as shown in FIG. 2, and the corresponding through-hole is provided to each rotor core 10. A connecting rod 22 is inserted into the through-hole of each rotor core 10 and the hole 24 of each end plate 14, consequently each rotor core 10 is roughly positioned relative to the end plates 14 by the connecting rod 22.

The rotor core 10, however, may be moved in a radial direction when a strong centrifugal force acts thereon because the sizes of the hole 24 and the through-hole are slightly larger than the outer diameter of the connecting rod 22. A clearance between the rotor 8 and a stator ST (schematically shown by a two dotted line in FIG. 2) is set to a very small value to reduce the reluctance. Therefore, contact may occur between the rotor core and an inner face of the stator ST when the rotor core 10 projects even slightly in a radial direction. To solve this problem, projecting portions 16 for regulating the rotor core 10 in the radial direction are provided at an outer periphery of each end plate 14 corresponding to the positions of rotor cores 10.

Generally, an outer dimension R1 of a central portion 10C of the rotor core 10 centrally positioned in a circular direction is larger than an outer dimension of an end portion 10E of the same positioned at ends thereof in a circular direction, and the clearance dimension between the central portion 10C and the stator ST is the minimum 11 of a clearance between the rotor and the stator. Therefore, for example, an inner diameter of the stator ST must be set to be slightly larger to maintain the clearance dimension 11 relative to the stator ST when the central portion 10C is covered with the projecting portion 16 of the end plate 14, and thus the reluctance becomes large. Therefore, the end plates 14 are formed in such a manner that only end portions 10E of the rotor core 10 are covered by each projecting portion 16 according to the present invention, and the outer dimension R2 of the end plate 14 is set to be slightly shorter than the outer dimension R1 of the central portion 10C of the rotor core 10. As shown in FIG. 2, according to the present invention, each projecting portion 16 is formed to extend over two rotor cores 10 adjacent to each other so that the same engages with two end portions 10E opposing each other of the two rotor cores 10. However, two respectively projecting portions may be formed to be engaged with each end portion 10E of each rotor core 10 instead of the above each one-piece type projecting portion 16. Furthermore, when an increase of the reluctance is negligible, a projecting portion may be formed along the entire outer periphery of the end plate 14 (that is, an annular flange) an outer dimension of which R2 is set to be slightly larger than the outer dimension R1 of the central portion 10C and may cover the central portion of each rotor core 10 to be in contact with an outer surface of each central portion.

Figure 3:
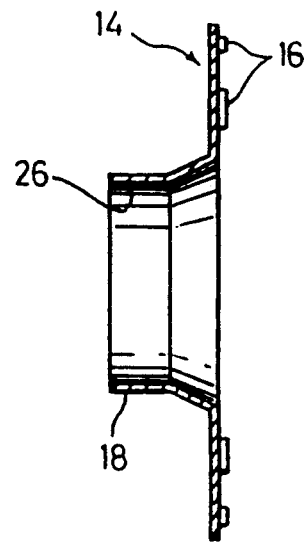
FIG. 3 is view taken along the line 3—3 of FIG. 2.

The inner diameter of a hole 26 of the attachment portion 18 of each end plate 14 shown in FIG. 3 is set in such a manner that the attachment portion is fixed to the output shaft 20 shown in FIG. 1, for example, by shrinkage fit. Two end plates 14 of both ends of the rotor 8 shown in FIG. 1 have the same shape and dimension. A stainless steel or the like is preferable as the material of each end plate 14, and each end plate can be precisely formed from a circular plate by mechanical pressing.

Figure 4:
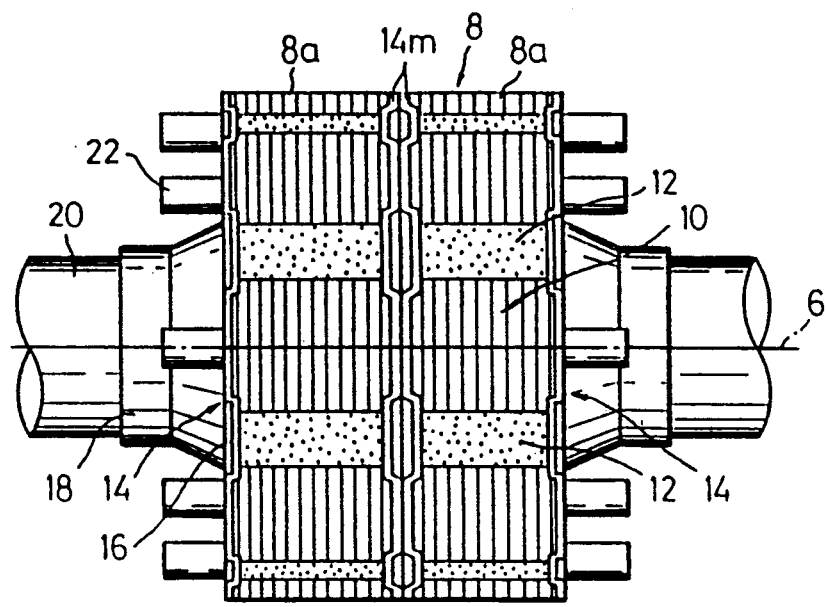
FIG. 4 is a side view of a rotor of another embodiment to the present invention.

When a rotor 8 has a long central axis, the same is generally constructed by arranging a plurality of rotor elements in the longitudinal direction. FIG. 4 shows an example of such a rotor. Two annular end plates 14m provided with the same projecting portions as in the above embodiments are disposed between two rotor elements 8a in such a manner that a back face of each plate is in contacts with the other to hold an end portion of each rotor element 8a. These end plates 14m have an annular shape and are not provided with an attachment portion such as the attachment portion 18 shown in FIG. 3 at a central portion thereof. Namely, where a rotor consists of a plurality of rotor elements 8a, both end portions of the rotor are held by the same end plates 14 as in the first embodiment, and other end portions of the rotor elements 8a are held by annular end plates 14m, two each of which are disposed between each rotor element 8a, back to back. Each annular end plate 14m may have the same shape and dimension.

Figure 5:
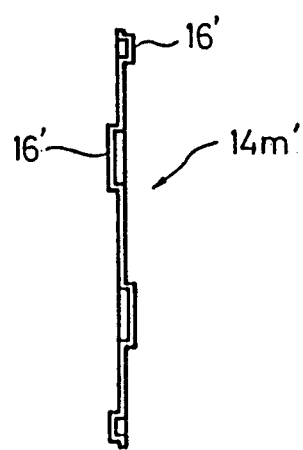
FIG. 5 is a side view of an end plate of another embodiment used in the present invention.

A side view of an annular end plate 14m' formed from one plate by mechanical pressing is shown in FIG. 5. This plate 14m' replaces the pair of two annular end plates 14m shown in FIG. 4. The end plate 14m' is formed in such a manner that projecting portions 16' project alternately to one side or to the other side of the end plate, and thus each rotor core of each rotor element 8a is held alternately.

Figure 6:
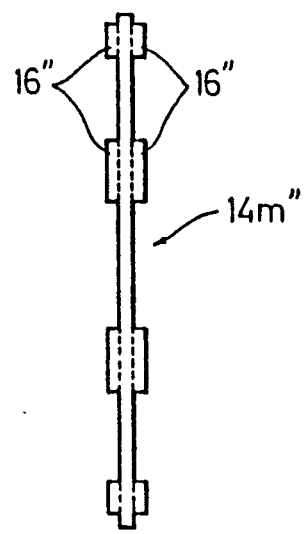
FIG. 6 view of an end plate of yet another embodiment of in the present invention.

FIG. 6 shows a side view of another annular end plate 14m" which replaces a pair of two annular end plates 14m shown in FIG. 4. The end plate 14m" is formed in such a manner that a plurality of pairs of projecting portions 16" project to both sides of the end plate, pair by pair, by which all rotor cores of each rotor element 8a are held.

As apparent from the foregoing description, according to the present invention there can be provided a rotor structure able to withstand a strong centrifugal force, and consequently, a large synchronous motor having a high revolutionary speed can be provided.

While the invention has been particularly shown and described in reference to preferred embodiments thereof, it will be understood by those skilled in the art that changes in form and details may be made therein without departing from the spirit and scope of the invention.

I claim:

1. A rotor structure having an axis of a radial type synchronous motor, comprising:
   permanent magnets arranged to be circumferentially arranged around said axis, each permanent magnet having flat axial ends thereof;
   rotor cores circumferentially arranged around said axis, each of said rotor cores having flat axial ends thereof on the same plane as said axial ends of each of said permanent magnets and being angularly held between adjacent permanent magnets to act as a magnetic pole; and
   a thin press-formed end plate member positioned at axial ends of said rotor cores and said permanent magnets, said plate member having a plurality of projections at a peripheral portion thereof for radially holding both said rotor cores and said permanent magnets and for regulating a radial position of an outer periphery of each of said rotor cores, each of said projections commonly engaging an entire outer periphery of one of said permanent magnets and a portion of an outer periphery of each of two of said rotor cores circumferentially positioned adjacent to said one of said permanent magnets, said projections extending substantially in parallel along the axis of the rotor, wherein each of said rotor cores includes a plurality of rotor elements arranged in the direction of said axis, and axial ends of each rotor element are held in a radial position by two of said end plate members.

2. A rotor structure of a synchronous motor according to claim 1, wherein a radial dimension from said axis to a circular end of the outer periphery of said rotor core is less than that of a center point of the outer periphery of said rotor core, and a radial dimension of the outer periphery of said end plate member is less than said dimension of said center point of said rotor core, and wherein said circular end of the outer periphery of said rotor core is held in a radial position by one of said projections.

3. A rotor structure of a synchronous motor according to claim 1, wherein said end plate member is positioned between each adjacent two of said plurality of rotor elements and is formed in such a manner that each of said projections is alternately directed to the opposite direction perpendicular to a plane of the end plate member.

4. A rotor structure of a synchronous motor according to claim 1, wherein a central portion of said end plate member includes an attachment portion for fixing onto an output shaft of said motor without a clearance therebetween.

5. A rotor structure having an axis of a radial type synchronous motor, comprising:
   permanent magnets;
   rotor cores arranged around said axis, each of said rotor cores being angularly held between adjacent permanent magnets to act as a magnetic pole; and
   a thin press-formed end plate member positioned at axial ends of said rotor cores, said plate member having a plurality of projections at a peripheral portion thereof for holding said rotor cores and for regulating a radial position of an outer periphery of each of said rotor cores, each of said projections engaging at least a portion of said outer core of at least one rotor core, wherein each of said rotor cores includes a plurality of rotor elements arranged in the direction of said axis, and axial ends of each rotor element are held in a radial position by two of said end plate members.

* * * * *

UNITED STATES PATENT AND TRADEMARK OFFICE
CERTIFICATE OF CORRECTION

PATENT NO. : 5,140,211

DATED : August 18, 1992

INVENTOR(S) : Hiroyuki Uchida

It is certified that error appears in the above-identified patent and that said Letters Patent is hereby corrected as shown below:

On the cover page, Item [75], the inventor's last name "Ucida" should read as -- Uchida --.

Signed and Sealed this

Sixteenth Day of November, 1993

*Attest:*

BRUCE LEHMAN

*Attesting Officer*  *Commissioner of Patents and Trademarks*